April 14, 1953    O. L. DUPY    2,635,220
DIRECT CURRENT MOTOR CONTROL
Filed June 28, 1951
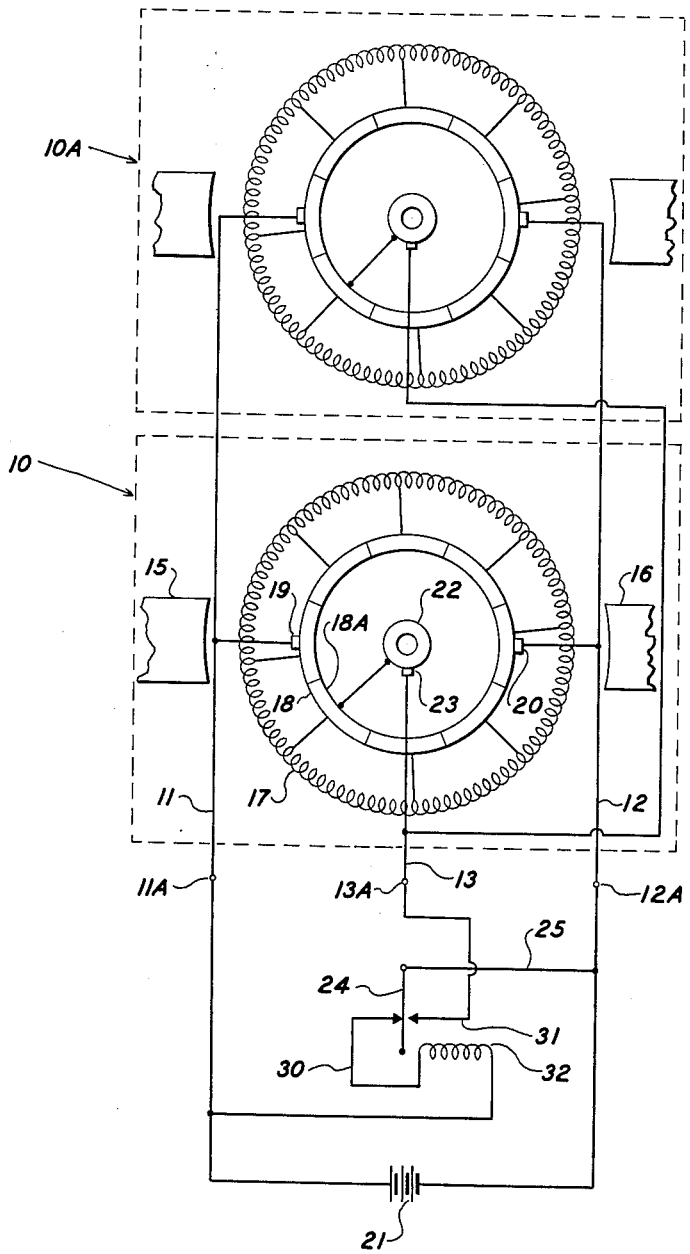
INVENTOR.
OLIN L. DUPY
BY
James B. Christie
ATTORNEY Patented Apr. 14, 1953

2,635,220

UNITED STATES PATENT OFFICE 2,635,220

DIRECT CURRENT MOTOR CONTROL

Olin L. Dupy, Los Angeles, Calif.

Application June 28, 1951, Serial No. 233,999

7 Claims. (Cl. 318—330)

This invention is concerned with direct current motors and provides novel control means for causing such motors to run in synchronism over a wide range of voltage and load changes with a periodic electric impulse derived from intermittent opening and closing of contacts of a vibrating reed or the like.

The invention may be employed to drive a plurality of D. C. motors in step with each other or with other A. C. motors or apparatus. The present application is a continuation-in-part of my co-pending application Serial No. 199,008, filed December 4, 1950, and is directed to improvement and simplification of one embodiment of the control means described and illustrated in said co-pending application.

It is convenient to energize a variety of equipment such as portable cameras, sound recording and reproducing apparatus and the like, with direct current from a battery, provided that the equipment can be made to run at constant speed. However, it has been difficult and expensive to obtain constant speed in such apparatus when employing a D. C. power source.

As described in the aforesaid co-pending application I have devised a new, reliable and inexpensive system for causing a direct current motor to run in synchronism with an alternating or pulsating impulse, which is conveniently induced by a set of make-and-break contacts actuated by a tuning fork or a vibrating reed. The fork, or reed, may, in turn, be driven by direct current so that the advantages of synchronous operation which accrue to alternating current motors may be obtained without resort to an alternating current reference. The present application deals with improvements and simplification in the control means driven from a D. C. power source, although the previously filed application is not limited to the use of a pulsating impulse thus derived, and finds application if a suitable auxiliary source of alternating current is available.

In accordance with my invention as described in my co-pending application, I provide a special electrical connection between the armature winding of an otherwise conventional D. C. motor and a source of periodic impulse such that the armature is caused to rotate in synchronism with a period of an impulse as induced by periodic opening and closing of contacts connected to short a portion of the armature winding or by a cyclic change in a rectified alternating current. A point on the armature winding is continuously connected to the source of the impulse, the return for this current being through the commutator and brush of the motor.

The motor to be regulated is set to rotate as an unaltered conventional D. C. motor at or above the desired synchronous speed. Then, as the synchronizing impulse is applied, a varying portion of the armature is periodically short-circuited. The current flowing in the short-circuited portion of the winding produces a dynamic braking action proportional to the tendency of the motor to deviate from the synchronous speed established by the period of the pulsating impulse. Consequently the braking action automatically increases as needed to hold the rotation of the motor in step with the control source, and decreases when a lesser braking action is required. In the embodiments of the invention as illustrated in my co-pending application and involving D. C. derivation of the pulsating impulse, a D. C. source auxiliary to the source of motivating power was employed to drive the vibrating mechanism.

I now have found that such a circuit may be simplified to eliminate such an auxiliary source by deriving the control impulse and the driving voltage for the motor or motors from a single source. The invention contemplates therefore in a direct current motor having a commutator with a plurality of segments connected to its armature winding, and first and second commutator brushes for connecting opposite sides of the commutator to opposite sides of a direct current source, the combination comprising a first external contact connected to one of the commutator brushes, a second external contact, means for connecting the second external contact continuously to a point on the armature winding through a segment of the commutator, a movable conductor disposed between the two extenral contacts and connected to the other of the commutator brushes and means for vibrating the conductor so that it alternately makes contact with the two external contacts.

The invention will be more clearly understood by reference to the following detailed description thereof taken in conjunction with the accompanying drawing which is a simplified wiring diagram illustrating the improved control means of the present invention.

The drawing shows a D. C. motor 10 provided with the usual field poles 15, 16 (which may be either a permanent or an electromagnet) and an armature 17 disposed therebetween. The armature is provided with a conventional winding connected to a commutator 18. The latter is provided with a plurality of insulated segments, each of which is connected to a corresponding point of the armature winding. The commutator has conventional brushes 19, 20 disposed electrically opposite each other and connected to leads 11 and 12 of an external circuit. The leads 11 and 12 are in turn connected through terminals 11A, 12A to a D. C. power source 21, illustrated as a battery in the drawing. To this extent the structure is purely conventional.

A slip ring 22 is keyed to the same shaft as the commutator to rotate therewith. The slip ring is permanently connected to one commutator segment 18A and to a point on the armature coil through this segment. A brush 23 rides on the slip ring and is connected by a lead 13 to an external circuit at terminal 13A.

The apparatus is provided with a conductive magnetizable vibrating reed 24 which is tuned to the desired frequency and is connected through lead 25 and terminal 12A to the external lead 12. The reed 24 is caused to vibrate, by means hereinafter described, between a pair of contacts 30, 31 that are connected respectively through terminal 11A to external lead 11 and through terminal 13A to external lead 13. In summary, the vibrating reed 24 is connected to one side of the commutator at the brush 20, and the contact 31 is connected to the commutator segment 18A through the brush 23 and slip ring 22. The connection of contact 30 to the voltage source is through a driving coil 32 by means of which the reed 24 is driven at its resonant frequency.

The reed 24 is at rest position in contact with the contact 30. In this position the coil 32 is momentarily energized to pull the reed 24 into contact with the contact 31. At the same time the coil 32 is de-energized so that the reed returns to the rest position to repeat the cycle.

The effect of the improvement herein described is to eliminate the necessity of an auxiliary voltage source for deriving the control impulse as is required in the circuits shown in the aforementioned co-pending application. The driving voltage for the motor as well as the driving voltage for the control impulse are obtained from the single source 21.

The circuit as herein described, therefore, has three advantages: (1) The contacts of the vibrator can be adjusted so that the frequency does not vary beyond usable limits; (2) by using only one set of contacts for the speed correction, the braking action is applied during one-half of a revolution only, thus permitting a better time balance between the free running and correction time; and (3) by means of contact 31, the battery that supplies power to the motor, can also be used to drive the vibrator.

Referring to the drawing, the armature is shorted through the contact 31 when the reed 24 engages this contact. During the duration of this engagement the synchronizing impulse is developed at the armature with a simultaneous braking action. The contact 31 is positioned and the critical characteristics of the reed 24 are selected to short the armature for the minimum period necessary to attain synchronism, thereby having no appreciable effect on the efficiency of the motor.

The explanation of the synchronizing effect of such a periodic short circuit is fully expounded in my co-pending application in relation to operational diagrams therein presented. Reference is had to that application.

As shown in the drawing, a second motor 10A, identical with the first, may be connected in parallel with it across the power source and the source of synchronizing impulse. In such case, both motors will be synchronized with each other and the synchronizing impulse. Additional motors may be connected in parallel in the same fashion, it being possible to run a large group of motors in synchronism with each other and at a predetermined rate by means of the single control circuit as illustrated.

I claim:

1. In a direct current motor having a commutator with a plurality of segments connected to its armature winding, and first and second commutator brushes for connecting the commutator to opposite sides of a direct current source, the combination comprising an external contact, means for connecting the external contact continuously to a point on the armature winding, a movable conductor connected to one of the commutator brushes, and means for vibrating the conductor so that it periodically makes contact with the external contact.

2. In a direct current motor having a commutator with a plurality of segments connected to its armature winding, and first and second commutator brushes for connecting the commutator to opposite sides of a direct current source, the combination comprising an external contact, means for connecting the external contact continuously to a point on the armature winding, a movable conductor connected to one of the commutator brushes, and means energized by the direct current source for vibrating the conductor so that it periodically makes contact with the external contact.

3. In a direct current motor having a commutator with a plurality of segments connected to its armature winding, and first and second commutator brushes for connecting the commutator to opposite sides of a direct current source, the combination comprising a first external contact connected to the direct current source, a second external contact, means for connecting the second external contact continuously to a point on the armature winding, a movable conductor disposed between the two external contacts and connected to one of the commutator brushes, and means for vibrating the conductor so that it periodically makes contact with the second external contact.

4. In a direct current motor having a commutator with a plurality of segments connected to its armature winding, and first and second commutator brushes for connecting the commutator to opposite sides of a direct current source, the combination comprising a first external contact connected to the direct current source, a second external contact, means for connecting the second external contact continuously to a point on the armature winding, a movable conductor disposed between the two external contacts and connected to one of the commutator brushes, and means energized by said source for vibrating the conductor so that it alternately makes contact with the two external contacts.

5. In a direct current motor having a commutator with a plurality of segments connected to its armature winding, and first and second commutator brushes for connecting the commutator to opposite sides of a direct current source, the combination comprising a first external contact connected to the direct current source, a second external contact, means for connecting the second external contact continuously to a point on the armature winding, a movable conductor disposed between the two external contacts and connected to one of the commutator brushes, and means connected between said source and the first external contact for vibrating the conductor so that it alternately makes contact with the two external contacts.

6. In a direct current motor having a commutator with a plurality of segments connected to its armature winding, and first and second commutator brushes for connecting the commutator to opposite sides of a direct current source, the combination comprising a first external contact, a second external contact, means for connecting the second external contact continuously to a point on the armature winding, a movable conductor disposed between the two external contacts and connected to one of the commutator brushes and one side of the voltage source, and a driving coil connected between the first external contact and the other side of the voltage source for vibrating the conductor so that it alternately makes contact with the two external contacts.

7. In a direct current motor having a commutator with a plurality of segments connected to its armature winding, and negative and positive commutator brushes for connecting the commutator to opposite sides of a direct current source, the combination comprising an external contact, means for connecting the external contact continuously to a point on the armature winding, a movable conductor connected to one of the commutator brushes, and means for vibrating the conductor so that it periodically makes contact with the external contact.

OLIN L. DUPY.

No references cited.